US010856525B2

(12) United States Patent
Christensen

(10) Patent No.: US 10,856,525 B2
(45) Date of Patent: Dec. 8, 2020

(54) EQUINE TAIL COVERING

(71) Applicant: Cassie Leona Christensen, Twin Falls, ID (US)

(72) Inventor: Cassie Leona Christensen, Twin Falls, ID (US)

(73) Assignee: Cassie Christensen, Jerome, ID (US)

( * ) Notice: Subject to any disclaimer, the term of this patent is extended or adjusted under 35 U.S.C. 154(b) by 115 days.

(21) Appl. No.: 16/203,431

(22) Filed: Nov. 28, 2018

(65) Prior Publication Data

US 2019/0166795 A1 Jun. 6, 2019

Related U.S. Application Data

(60) Provisional application No. 62/593,247, filed on Dec. 1, 2017.

(51) Int. Cl.
*A01K 13/00* (2006.01)

(52) U.S. Cl.
CPC .......... *A01K 13/005* (2013.01); *A01K 13/006* (2013.01)

(58) Field of Classification Search
CPC ...... A01K 13/005; A01K 13/006; B68B 5/04; B68C 5/00
USPC ........................................................ 54/78, 1
See application file for complete search history.

(56) References Cited

U.S. PATENT DOCUMENTS

| | | | | | |
|---|---|---|---|---|---|
| 127,918 | A | * | 6/1872 | Parson et al. | B68B 5/04 54/78 |
| 148,367 | A | * | 3/1874 | Howard | A01K 13/005 54/78 |
| 212,836 | A | * | 3/1879 | Briggle | B68B 5/04 54/78 |
| 336,359 | A | * | 2/1886 | Turnure | B68B 5/04 54/78 |
| 385,721 | A | * | 7/1888 | Muntz | B68B 5/04 54/78 |
| 1,343,147 | A | * | 6/1920 | Liechty | B68B 5/00 54/78 |
| 2,487,005 | A | * | 11/1949 | Walker | A01K 13/005 54/78 |
| 3,347,018 | A | * | 10/1967 | Laidig | A01K 13/005 54/78 |
| 4,378,667 | A | * | 4/1983 | Velarde, Jr. | A01K 13/005 119/809 |
| 4,972,660 | A | * | 11/1990 | Black | A01K 13/005 54/78 |
| 5,086,612 | A | * | 2/1992 | Anderson | A01K 13/005 119/600 |
| 5,462,020 | A | * | 10/1995 | Trimmer | A01K 13/005 119/850 |
| 5,694,750 | A | * | 12/1997 | Allen | A01K 13/005 54/78 |
| 2007/0084155 | A1 | * | 4/2007 | Penge | A01K 13/006 54/78 |

(Continued)

*Primary Examiner* — Amy R Weisberg

(57) ABSTRACT

The present invention generally relates to equine tail coverings used to keep the equines tail clean, promote growth and repel insects. The conventional tail bag is typically loose fitting and does not typically have the durability needed to keep up with an active equine. The present invention uses a compressive force to help hold the covering in place while it protects the tail and the artificial tassels serve as a replacement for the natural tail of the horse in order for the equine to have full functionality of their tail.

11 Claims, 6 Drawing Sheets

(56) References Cited

U.S. PATENT DOCUMENTS

| | | | | |
|---|---|---|---|---|
| 2009/0188438 A1* | 7/2009 | Schmucker | ............ | A01K 13/00 119/601 |
| 2010/0018171 A1* | 1/2010 | Beale | ................... | A01K 13/006 54/79.2 |
| 2012/0006281 A1* | 1/2012 | Rabinowitz | ............ | A01K 13/00 119/601 |

* cited by examiner

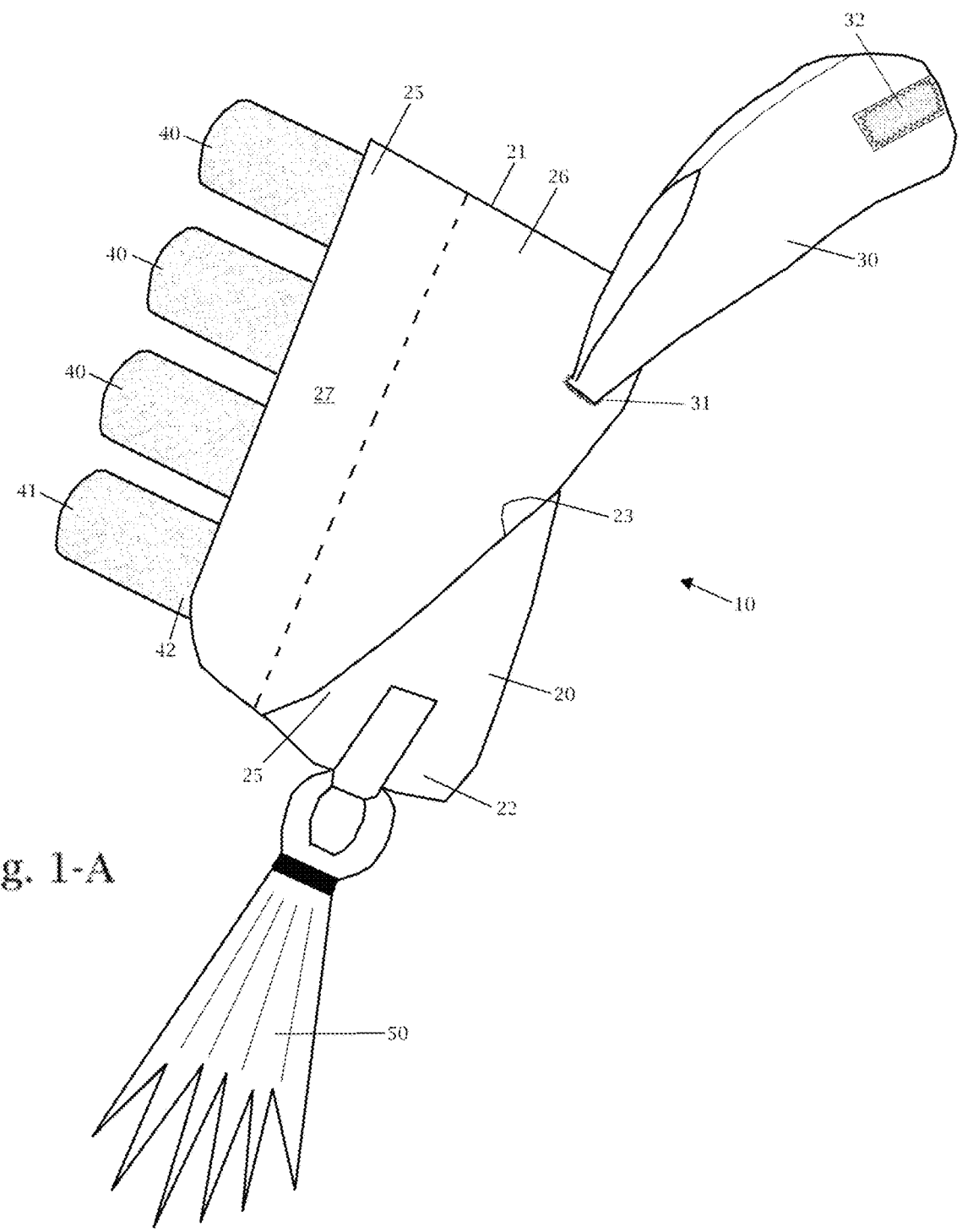
Fig. 1-A

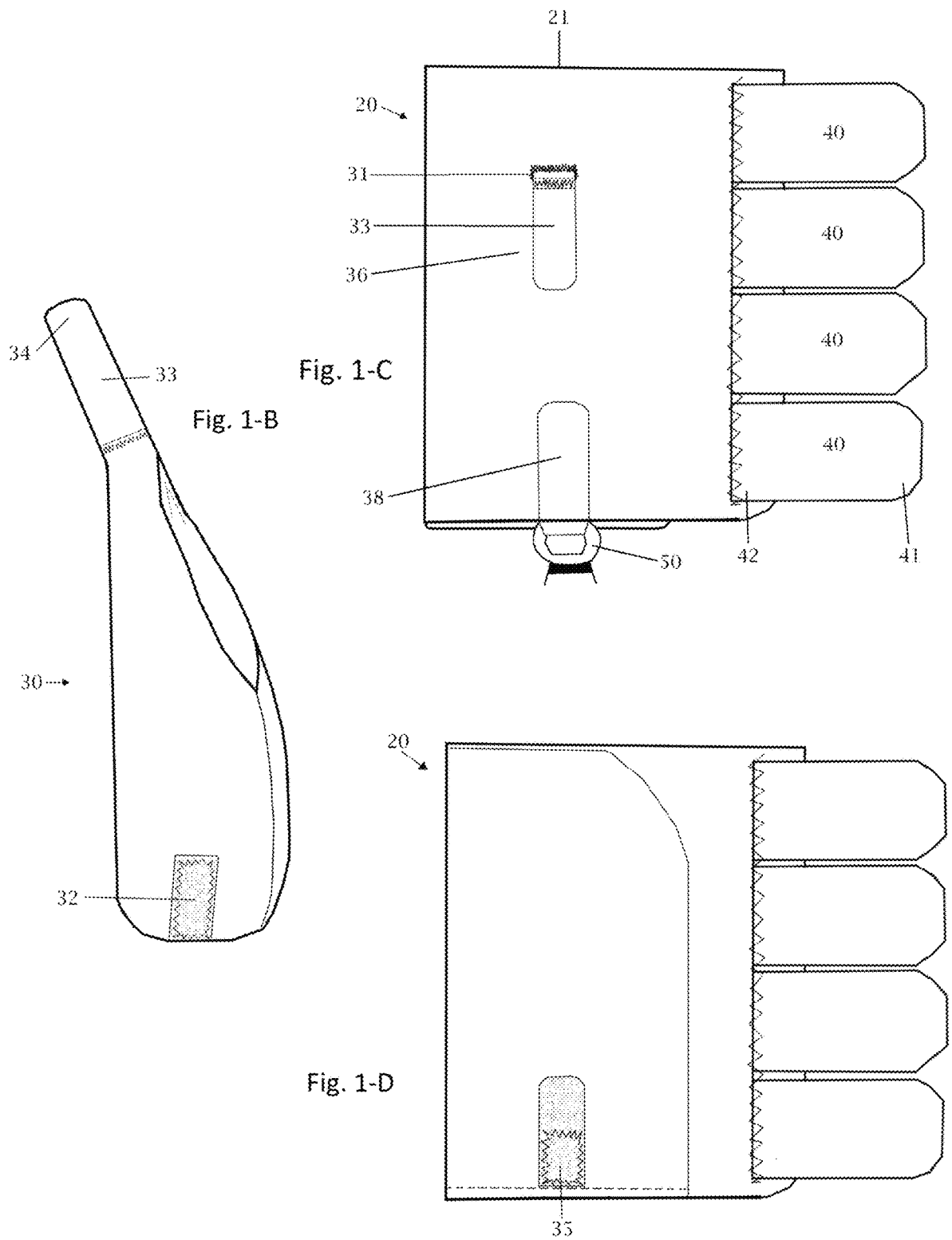

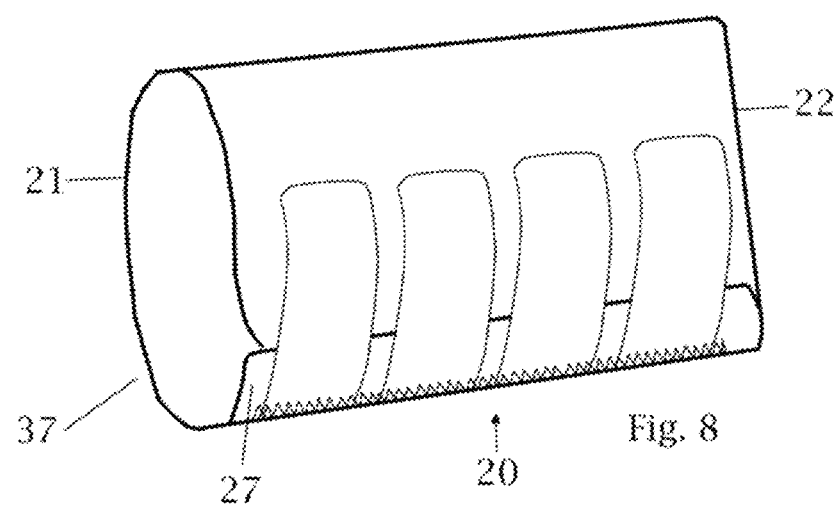

EQUINE TAIL COVERING

FIELD OF THE INVENTION

The present disclosure relates to a protective covering for animal tails and more particularly to a covering for an equine animal, such as a horse, a donkey, or a mule.

BACKGROUND

With the equine industries overall involvement throughout the world, the demand for products that help protect the overall physical appearance and limb functionality of these equine athletes seems to have a demand. Niche markets for products that make grooming require less maintenance are always being tested. Up until this point there are few products that may be purchased for the equine tail that can withhold the daily wear of these busy animals. The tail of an equine has many purposes whether it is for overall appearance, an indication of the horses' body language or for the simple functionality of controlling insects. Most current applications do not allow the tail to function in its natural state because the method of applying the tail covering is loose fitting and is less aerodynamic. This equine tail covering has tried to improve some of the missing elements of current applications by using compression, artificial tassels and more durable materials. The idea expressed below came about from years of trying to find a practical, reusable method that allows the animal to control insects while protecting the equine tail from the elements of use.

RELATED ART

Tail coverings exist for equine animals, such as horses and donkeys, and typically include a loose pouch that receives a braided tail of a horse. Such tail coverings attempt to protect hairs of the tail from breaking and thinning, which may occur either as the horse swishes their tail back and forth and/or from the weather. Tail coverings may include artificial tassels that enable a horse to swat flies, while the tail is protected within the covering.

The applicant has appreciated that conventional tail coverings are loose fitting, long sacks that allow the hair of a horse to become tousled and tangled in a short period of time, even when braided. These conventional coverings may also hinder the equines natural ability to easily swish their tail in an aerodynamic manner to repel insects. The applicant has also appreciated that the length of conventional tail coverings can inhibit the ability of a horse to freely back up when the tail covering is stepped on by the horse.

BRIEF SUMMARY OF THE INVENTION

The equine tail covering disclosed herein uses compression to hold a braided and folded tail of an equine. Attached to the body of the tail covering there is an interior sock that receives a braided and folded tail and may help prevent tangling, tousling, and damage to the tail hairs of the equine while holding the body of the tail covering in place. This method of securing the body in place is made possible, but not limited to, two bonding areas between the interior sock and the body of the tail covering. The first bond is formed when a securement strap passes through an eyelet on the interior of the body and is connected to the exterior by the means of a hook and loop type material. The second bond is formed, but not limited to, when the interior sock connects to an interior hook and loop fastener placed on the lower end of the body. This securement holds the covering to the tail in a desired position relative to the braid and the end of the horse's tailbone by adjusting the securement strap. Once the body of the covering is positioned about the braided and folded tail, compression straps are fastened about the covering body to compress the covering about the braided and folded tail to further assist in holding the covering in place. The covering may include tassels that extend from an end of the body to replicate the tail of the horse for the purpose of swatting flies

BRIEF DESCRIPTION OF THE FIGURES

In the drawings, different embodiments of the invention are illustrated as an example and are not limited but the figures of the accompanying drawings in which:

FIG. 1-A is a view of one example embodiment of a tail covering in a position to receive the braided and folded tail of a horse.

FIG. 1-B is a view of the interior sock of the tail covering prior to being placed through the eyelet of the body.

FIG. 1-C is a posterior view example of the body of the tail covering with the securement strap after it has been passed through eyelet and with the tassel attachment.

FIG. 1-D is an inverse view example of the body which displays the interior view of the body of the tail covering.

FIG. 5 is a view of a braided horse tail, prior to being folded and inserted into a tail covering.

FIG. 8 is a view of the cylindrical shape of the tail covering.

DETAILED DESCRIPTION OF THE INVENTION

Figure 2:
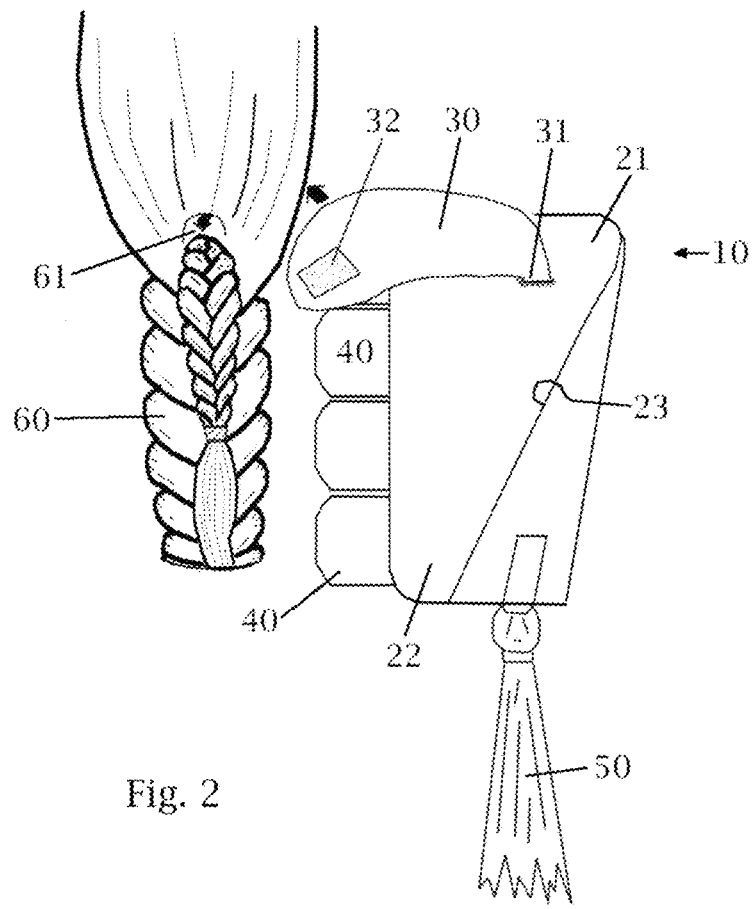
FIG. 2 is a view of one example embodiment of a tail covering positioned adjacent to a braided and folded tail of an equine that may be placed into the covering.

Embodiments of the tail covering disclosed herein include an interior sock that receives a braided and folded tail of a horse. The covering also includes a securement strap that holds the covering to the tail in a desired position relative to the braid and the end of the horse's tailbone by adjusting the securement strap. The interior sock may further prevent tangling, tousling, and damage to the tail hairs of the horse. Once the body of the covering is positioned about the braided and folded tail, compression straps are fastened about the covering body to compress the covering about the braided and folded tail to further assist in holding the covering in place. The covering may include tassels that extend from an end of the body to replicate the tail of the horse for the purpose of swatting flies.

Turn now to the Figures and initially FIG. 1-A which shows one example embodiment of an equine tail covering 10, according to the present disclosure. The covering 10 includes a cylindrical shaped body 20, 37 that extends between a first end 21 and a second end 22. The first end 21 is open to receive the tail 60 and the second end 22 is closed. The body 20 of the covering 10 includes a slit 23 that is defined by opposed slit sides 25 of the body 20 and that extends from the first end 21 and towards the second end 22. The tail covering 10 has an interior sock 30. The interior sock has a covering securement strap 33 that has a first end 34 which is passed through an eyelet 31 and connected to the exterior of the body 20 and a second end 32 that is connectable to an interior attachment 35 of the body 20, after the interior sock 30 has been placed through the braid 61 and around the folded tail 60. Compression straps 40 extend across the slit 23 of the body and may be fastened to compress and hold the tail 60 within the covering body 20. Artificial tassels 50 are connected to the second end 22 of the body 20 to emulate an equine tail for swatting flies, and the like.

The body 20 of the covering 10 may be constructed and arranged to fully enclose and securely hold a braided and folded equine tail 60. To help accomplish this, the body 20 may have a size similar to the braided and folded tail 65 of a typical horse or other equine animal. Sizing the body 20 in this regard may help tightly hold the tail in place once positioned inside of the covering 10. According to some illustrative embodiments, the body 20 has a generally cylindrical shape 37 with a length of between about 5 inches to about 12 inches and a diameter of between about 1 inch and about 6 inches, although other shapes and sizes are also contemplated.

The body 20 may include or be constructed of an elastic material to promote secure holding of the equine tail 60 once inside the covering 10. Elastic material of the body may create a compression force against the braided and folded tail 65, particularly where the body 20 is sized similar to the size of the tail. This compression force may prevent unwanted movement of the tail 60 within the body 20, which might otherwise lead to tangles and/or damage of the tail hairs. According to some illustrative embodiments, the body 20 is made of an elastic polychloroprene-type material such as NEOPRENE (TRADEMARK), although other materials are also contemplated, including non-elastic materials.

The body 20 of the covering 10 may include an opening 26 that expands with the aid of the slit 23 and opposing sides 25 to help receive the braided and folded horse tail 65. As illustrated, the opening 26 is at the first end 21 of the body 20. The slit 23 extends from the first end 21 and toward the second end 22 of the body and is bound by opposing sides 25 of the covering body. When the opposing sides 25 of the slit 23 are pulled away from one another, the overall opening of the enclosure is expanded to better receive the braided and folded tail 65 of the equine.

The body 20 of the covering 10 may include fasteners 40 to close the slit 23 and to help secure the braided and folded tail 65 within the covering 10. In the illustrated embodiment on FIG. 4, compression straps 40 extend across the slit 23 to accomplish this. A first end 42 of each compression strap 40 is secured to a first of the opposed sides 25, such as by being sewn thereto. The second free end 41 of each of the compression straps 40 is selectively securable to the other opposed slit sides 25, such as by a hook and loop fastener. In this respect, the compression straps 40 can be used to close the slit 23 after the braided and folded tail is positioned within the body 20. The compression straps 40 can also be fastened in a tightened manner that helps compress or cinch the tail within the body 20 of the covering to prevent tangling and damage of tail hairs. The uppermost compression strap 40 of the covering 10 may be positioned to lie at least partially at or above the braid of the horse's tail, such as may be seen in FIGS. 3 and 4. In such situations, the uppermost compression strap may be fastened to compress the first end 21 of the covering body 20 to a smaller diameter than other portions of the body. Creating a smaller diameter at the first end of the body may help create a restriction that prevents the covering 10—from slipping down the braided horse tail 60.

One or both of the opposed sides 25 of the slit 23 may include features to promote full enclosure of the braided and folded tail within the covering. In the illustrated embodiment of FIG. 1-A, a first of the opposed sides 25 includes a flap 27 that is shaped and sized to lie over the other opposed side 25 when the horse tail 60 is positioned in the covering 10. In this respect, the flap 27 prevents the tail or hairs of the tail from escaping through the slit 23. The flap may additionally prevent elements, such as rain, snow, dirt, and the like, from accessing the tail inside of the covering.

The covering, as shown in the Figures, includes an interior sock 30 that receives at least a portion of the braided and folded equine tail 60 and, in turn, may be positioned inside of the covering body 20. The interior sock 30 may be constructed to fit snugly about the braided and folded tail, either by being sized similar to the tail and/or by being made of an elastic material. The interior sock 30 may create a liner inside of the covering body 20 that may serve as an extra layer of protection and also may allow for a minor amount of movement between the braided tail 65 and the covering body 20. In the illustrated example embodiment, the interior sock 30 also serves as the method of securement to hold the tail covering 10 in position. By lessening the movement of the tail covering the application of this idea may be more effective in preventing the tail from becoming tangled, tousled or damaged. For the tail covering 10 to be secured, the interior sock is bound near the first 21 and second end 22 of the body 20. The first securement is made by passing the first end 34 of the securement strap 33 through an eyelet 31 on the interior of the covering body 20 and connecting it to the exterior 36 of the body 20. The eyelet 31 that receives the securement strap 33 is place near the first open end 21 of the body. In use, the second end 32 of the interior sock 30 is passed through the uppermost loop 61 of the braided and folded tail 65 of the equine. The interior sock 30 may then be placed around to contain the folded tail 65 of the equine. The second bond to the covering body may be formed when the second end 32 of the interior sock 30 comes in contact near the second end 22 of the covering body 20 to the interior attachment 35, such as by a hook and loop type fastener.

In use, the securement strap 33 may be set and/or adjusted to position the tail covering 10 within the upper most portion 62 of the tail braid and/or the distal end 63 of the tailbone of the equine. As may be appreciated, the tail of an equine is typically braided up to a point that lies about two inches below the distal end 63 of the horse's tailbone. It may be generally desirable to cover as much of the tail of an equine as possible without covering the tailbone of the equine, according to some approaches. The eyelet 31 may be positioned a distance from the first end 21 of the covering body 20 to help accomplish this. The interior sock 30 may also help in the overall covering 10 placement by the positioning of the securement strap 33. This positioning distance, as referred to herein, may be between about one or two inches for some embodiments. A covering having a securement strap positioned about one inch from the first end of the covering body may thus result in a covering that can have the first end of the covering body positioned about one inch from the tailbone of the horse—enclosing most of the equine tail without interfering with the tailbone.

Example embodiments of the covering may include artificial tassels 50 that replicate the equine tail 60 for the purpose of swishing flies. Tassels may be constructed of nylon rope and attached 38 to the body of the covering by hook and loop fasteners, according to some embodiments. The tassels may be sized to have a length long enough to enable effective fly swishing when the horse moves its tail, yet short enough to prevent being stepped on by the horse when backing up. The tassels may also help the limb function of the equine to swish more naturally because of its similarity to the natural tail. According to some example embodiments, the tassels may be removed under weather conditions when flies are not typically present.

Figure 3:
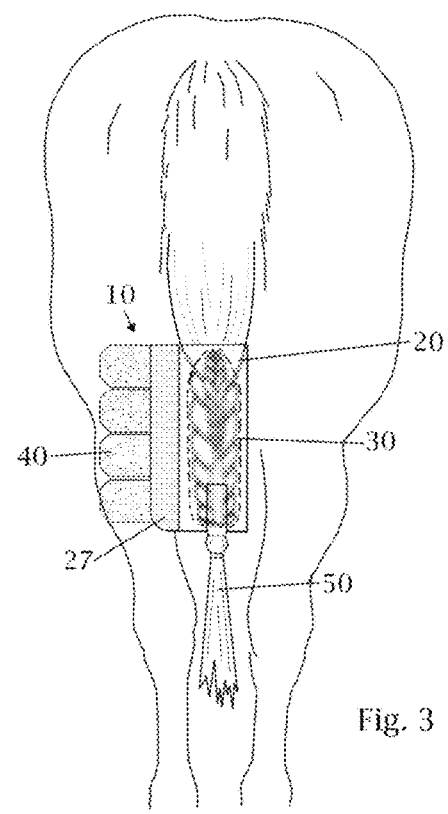
FIG. 3 is a view of the example embodiment of FIG. 2, with the braided and folded tail positioned inside of the tail covering and compression straps of the tail covering unfastened.
Figure 4:
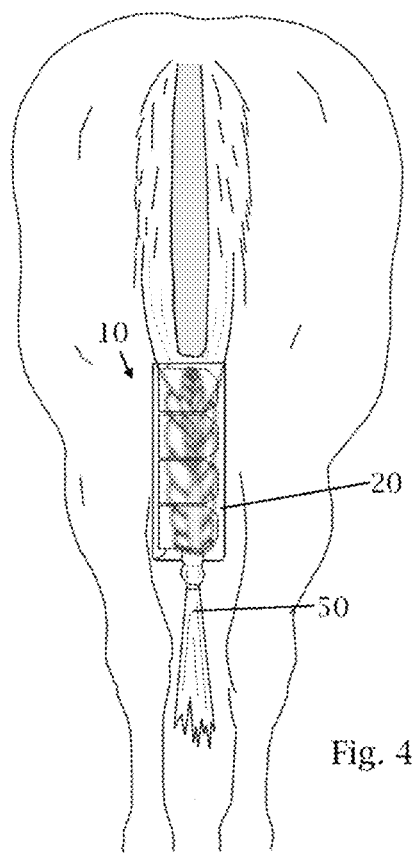
FIG. 4 is a view of the example embodiment of FIGS. 2 and 3 with the compression straps of the tail covering fastened.
Figure 6:
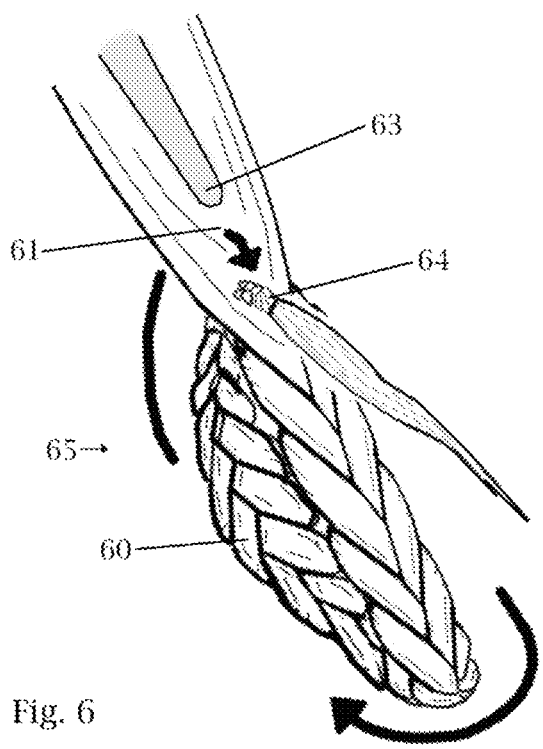
FIG. 6 illustrates folding of a distal portion of a tail through an eye of the braided tail to form a braided and folded tail.
Figure 7:
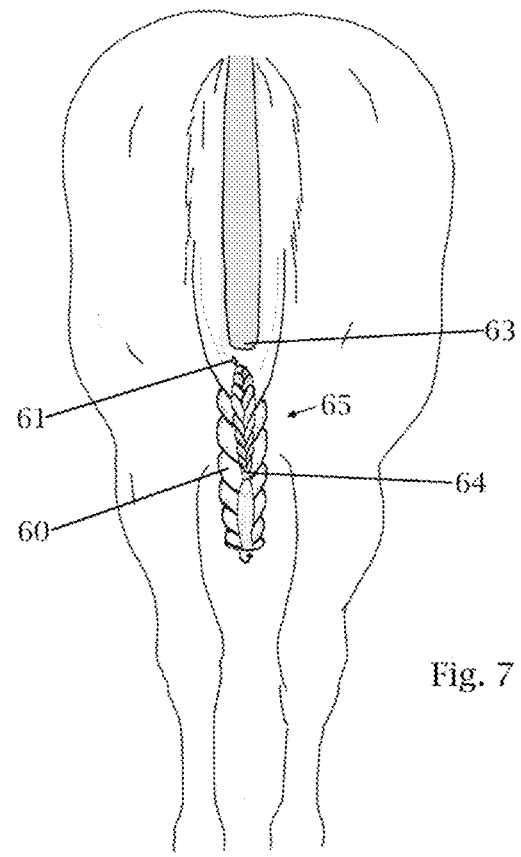
FIG. 7 is a view of a braided and folded horse tail.

The process of applying the tail covering is illustrated in the order as shown in FIGS. 5 to 7 and then FIGS. 2 to 4. The process begins by first braiding the horse's tail 60, as shown in FIG. 5. Enough room may be provided to create an eye or eyelet 61 in the hairs of the tail between the top of the braid and the distal end of the horse's tailbone 63. After braiding, the distal end 64 of the tail 60 may be folded upwards and passed through the eye 61 in the tail 60 as shown in FIG. 6, and then pulled downwards to lie adjacent to other portions of the braided tail, creating a folded and braided tail as shown in FIG. 7. For most equines, the braided and folded tail will end up having a size between about 3 inches and about 10 inches, depending on the length and general thickness of the tail hair.

Once braided and folded, the second end 32 of the interior sock of the tail covering is passed through the eye 61 of the horse's tail as shown in FIG. 2. The braided and folded tail is then placed inside of the interior sock 30 of the tail covering 10. The covering is positioned so the first end of the covering body 20 lies about one to two inches from the distal end 63 of the horse's tailbone, or as desired by the user. The second end 32 of the interior sock 30 is then fastened to the covering body 20 to hold the covering in position relative to the braid and tailbone, as shown in FIG. 3.

The compression straps 40 may be fastened with the braided and folded tail 60 now positioned as desired inside of the tail covering, as shown in FIG. 4. Typically, the middle most compression straps are fastened first and then the lower most and upper most compression straps. The upper most compression strap may be cinched together to create a restriction at the first and of the covering body, as described herein. Generally speaking, the compression straps may be cinched as tightly as needed to prevent motion of the braided and folded tail within the covering and/or to prevent the tail hairs from becoming tousled. The tassels 50 that form the artificial tail may be removed from and reattached to the covering body, as desired, for tail swatting.

What is claimed is:

1. A covering for a tail of an equine animal, comprising:
    a body that is constructed of an elastic material and that is constructed and arranged to receive a braided and folded tail of the equine animal, said body having a first end that defines an opening to receive the tail of the equine animal, a second end opposite to said first end, and a pocket member that extends from said first end toward said second end;
    one or more compression straps that each have a first end connected to a first side of said body opposite the pocket member and a second end that is removably securable to a second of said body member adjacent said pocket member, said compression straps constructed and arranged to compress the equine tail within said body; and
    an interior sock that is connected to said body and that is shaped and sized to receive at least a portion of the braided and folded tail in the interior sock constructed and arranged to fit inside of the body.

2. The covering of claim 1, wherein the interior sock includes a securement strap.

3. The covering of claim 1, further comprising: a plurality of artificial tassels connected to said second end of said body.

4. The covering of claim 1, wherein said interior sock has a securement strap end that is connected to said body at a distance from said first end of the body that positions said securement strap near an end of the tail bone of the equine animal.

5. The covering of claim 4, wherein said distance is between 1 and 2 inches.

6. The covering of claim 4, wherein said interior sock comprises an enclosure that receives and covers at least a portion of the braided and folded tail of the equine animal.

7. The covering of claim 6, wherein said interior sock has a second end that is securable to an interior of said body to secure said interior sock to the body member.

8. The covering of claim 1, wherein said second end of said body is closed.

9. The covering of claim 1, wherein said body is constructed of neoprene.

10. The covering of claim 1, wherein said one or more compression straps are securable to said body by hook and loop fasteners.

11. The covering of claim 1, wherein said body is configured to cinch about an upper end of the braided and folded tail of the equine animal to secure the covering to the tail.

\* \* \* \* \*